(12) United States Patent
Rice

(10) Patent No.: US 7,931,828 B2
(45) Date of Patent: Apr. 26, 2011

(54) GAS TURBINE ENGINE AND METHOD INCLUDING COMPOSITE STRUCTURES WITH EMBEDDED INTEGRAL ELECTRICALLY CONDUCTIVE PATHS

(75) Inventor: Edward Claude Rice, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 243 days.

(21) Appl. No.: 12/125,393

(22) Filed: May 22, 2008

(65) Prior Publication Data

US 2009/0289232 A1   Nov. 26, 2009

(51) Int. Cl.
*H01B 1/04* (2006.01)
*H01B 1/18* (2006.01)
*F02C 7/00* (2006.01)
(52) U.S. Cl. .............. 252/511; 60/39.34; 427/180
(58) Field of Classification Search .............. 252/511; 60/39.34; 427/180
See application file for complete search history.

(56) References Cited

U.S. PATENT DOCUMENTS

| | | | |
|---|---|---|---|
| 6,610,193 B2 | 8/2003 | Schmitman | |
| 6,616,402 B2 | 9/2003 | Selsam | |
| 6,983,599 B2 * | 1/2006 | Young et al. | 60/722 |
| 6,995,649 B2 | 2/2006 | Nugent | |
| 7,029,517 B2 * | 4/2006 | Lemmon et al. | 95/116 |
| 7,199,498 B2 * | 4/2007 | Pinkerton et al. | 310/152 |
| 7,256,345 B2 | 8/2007 | Inoue | |
| 7,650,050 B2 * | 1/2010 | Haffner et al. | 385/12 |
| 7,736,131 B1 * | 6/2010 | Wilson, Jr. | 416/226 |
| 2004/0239210 A1 * | 12/2004 | Pinkerton et al. | 310/309 |
| 2005/0036933 A1 * | 2/2005 | Moy et al. | 423/439 |
| 2006/0159916 A1 * | 7/2006 | Dubrow et al. | 428/357 |

FOREIGN PATENT DOCUMENTS

| EP | 1826402 A1 | 8/2007 |
|---|---|---|
| EP | 2065681 A1 | 6/2009 |
| WO | WO 2004106420 A2 * | 12/2004 |

* cited by examiner

*Primary Examiner* — Douglas Mc Ginty
(74) *Attorney, Agent, or Firm* — McCormick, Paulding & Huber LLP

(57) ABSTRACT

A gas turbine engine and method of fabrication includes a gas turbine engine with a structure having movable portions and static portions. At least a portion of the structure includes a composite material having an electrically conductive path formed from carbon nanotubes configured for conducting electrical signals therealong.

11 Claims, 3 Drawing Sheets

GAS TURBINE ENGINE AND METHOD INCLUDING COMPOSITE STRUCTURES WITH EMBEDDED INTEGRAL ELECTRICALLY CONDUCTIVE PATHS

FIELD OF THE INVENTION

The present invention is directed generally to gas turbine engines, and more particularly to gas turbine engines including composite structures having embedded electrically conductive paths.

BACKGROUND OF THE INVENTION

Current state of the art consists of wiring harnesses routed outside a gas turbine engine. Routing of these harnesses can be time consuming and difficult. Harnesses can also be snagged on adjacent features surrounding a gas turbine engine or by mechanics working on the engine. Vibration can also wear through protective coverings surrounding the wire bundle.

There is a continuing need for technology development relating to gas turbine engine construction, assembly and method. The present invention satisfies this need in a novel and nonobvious way.

SUMMARY OF THE INVENTION

In a first aspect of the present invention, a gas turbine engine comprises a structure having movable portions and static portions. At least a portion of the structure includes a composite material having an electrically conductive path formed from carbon nanotubes configured for conducting electrical signals therealong.

In a second aspect of the present invention, a gas turbine engine comprises a plurality of turbine blades and a static structure supporting and housing the blades. At least a portion of the static structure includes a composite material having an electrically conductive path formed from carbon nanotubes configured for conducting electrical signals therealong. A composite airframe or an engine casing may include a composite material having an electrically conductive path formed from carbon nanotubes for conducting electrical signals along the casing. Moreover, at least one of a plurality of struts supporting engine components may include a composite material having an electrically conductive path formed from carbon nanotubes for conducting electrical signals therealong.

Preferably, the composite material includes a plurality of electrically conductive paths, and further includes a nano switch coupled to the electrically conductive paths so as to be configured for selectively electrically coupling the electrically conductive paths to an external component. A connector is preferably located on a surface of the composite material and coupled to an end of the electrically conductive path for electrically coupling the electrically conductive path to an external component.

In a third aspect of the present invention, a composite structure comprises a composite material. A portion of the composite material includes fibers and a resin impregnated with a predetermined volume percentage of carbon nanotubes substantially surrounding the fibers to form electrically conductive paths therealong. Another portion of the composite material includes fibers and a resin unfilled with carbon nanotubes substantially surrounding the fibers to form electrically non-conductive paths therealong.

In a fourth aspect of the present invention, a method of fabricating a gas turbine engine comprises providing a structure having movable portions and static portions. At least a portion of the structure includes a composite material. Carbon nanotubes are embedded in at least a portion of the structure to form an electrically conductive path configured for conducting electrical signals therealong.

DETAILED DESCRIPTION OF THE PREFERRED EMBODIMENTS

Figure 1:
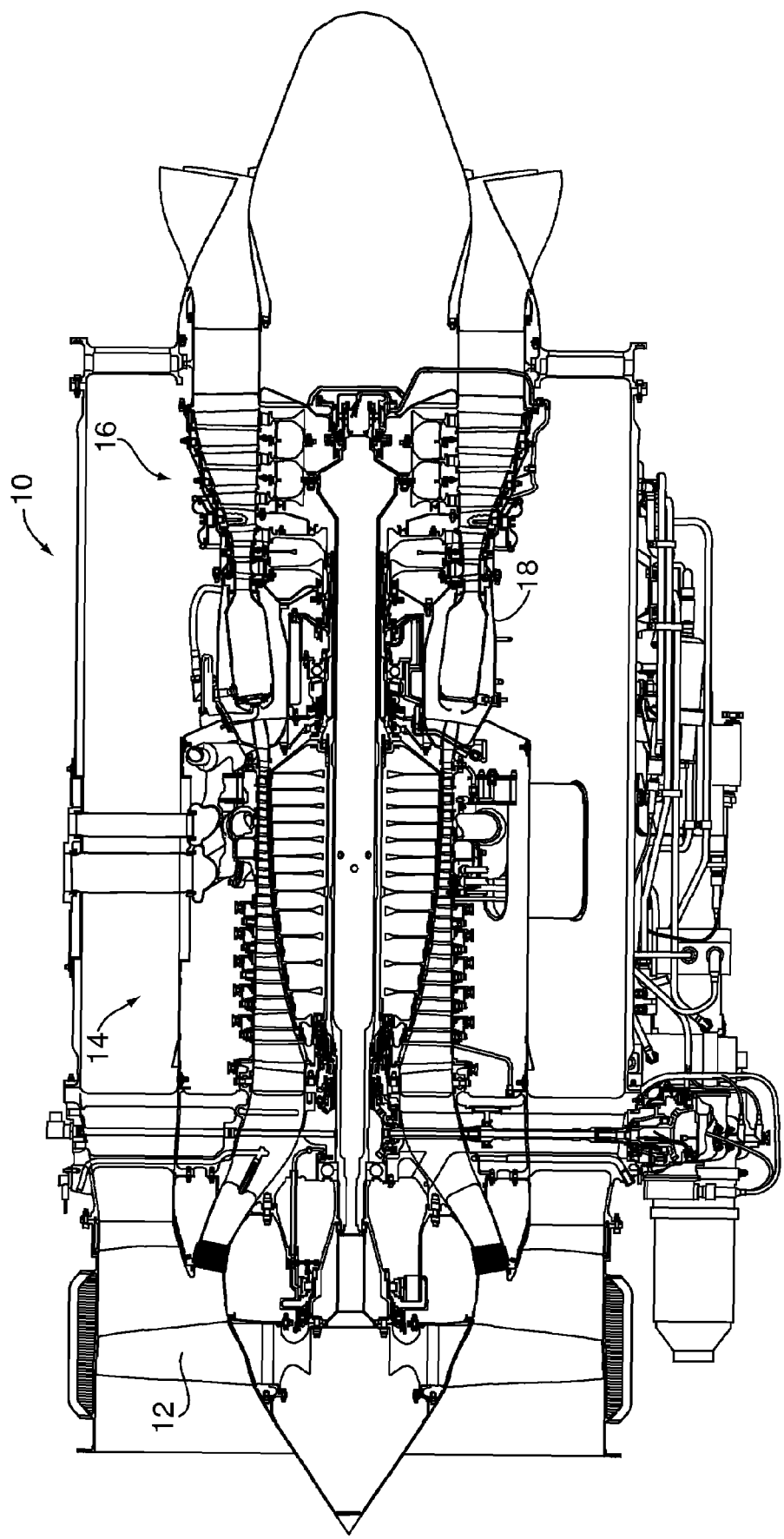
FIG. 1 is a cross-sectional view of a gas turbine engine incorporating composite structures with embedded electrical paths in accordance with the present invention.

FIG. 1 is a cross-sectional view of a gas turbine engine 10 illustrating, by way of example only, a context for implementing composite structures with embedded integral electrically conductive paths in accordance with the present invention. The gas turbine engine 10 includes, among other things, a fan rotor 12, compressor section 14, turbine section 16 and an engine casing 18. Although composite structures with embedded integral electrically conductive paths will be explained in the context of a gas turbine engine, it should be understood that such composite structures can be implemented in other applications where wiring harnesses are typically used.

Gas turbine engines typically include a plurality of wiring harnesses (not shown) for enabling communication among sensors and other electronic circuitry associated with the gas turbine engine.

The present invention is directed to structures such as, for example, composite airframes and gas turbine engines, which eliminate or reduce the number of external wiring harnesses used with the structure by embedding electrical paths formed with nanotubes in composite airframes and various gas turbine static structures such as engine cases, struts and the like. The electrical paths can also be embedded in movable portions of a gas turbine engine such as the turbine blades. More specifically, the structure is fabricated from a composite material such as, for example, a carbon fiber resin matrix (composite fiber) or fibers from other materials such as glass or boron. The structure is processed using a machine similar to, but not limited to, a fiber placement machine. This resin can be added to fibers to form a prepreg fiber and wound onto a spool using a conventional fabrication technique. Many pre-wound rolls of prepreg fibers are placed into a fiber placement machine for the fabrication of composite structures.

Carbon fiber/resin matrices are not typically electrically conductive; however, when a small percentage of carbon nanotubes (CNT) are added to a resin, the matrix becomes electrically conductive. In accordance with the present invention, as prepreg fibers are positioned around a mandrel to form a structural support, CNT impregnated fibers can be positioned within the structure to provide electrical paths that are embedded within the structure. Electrical connectors can be positioned on the structure surface to mate with external connectors being integral to electrical components, cable harnesses, or any feature that carries electricity or electrical signals. Multiple electrical paths can be positioned within the structure with "nano-switches" positioned at either or both ends of the conductive path. In the event of a severed path, a diagnostic element could sense loss of signal and transfer to another path that is still functional.

When the structure is a gas turbine engine, sensors can be placed within the structure to sense stress/strain levels, temperatures, or any other parameter that can be used to diagnose engine problems or monitor engine health.

Figure 2:
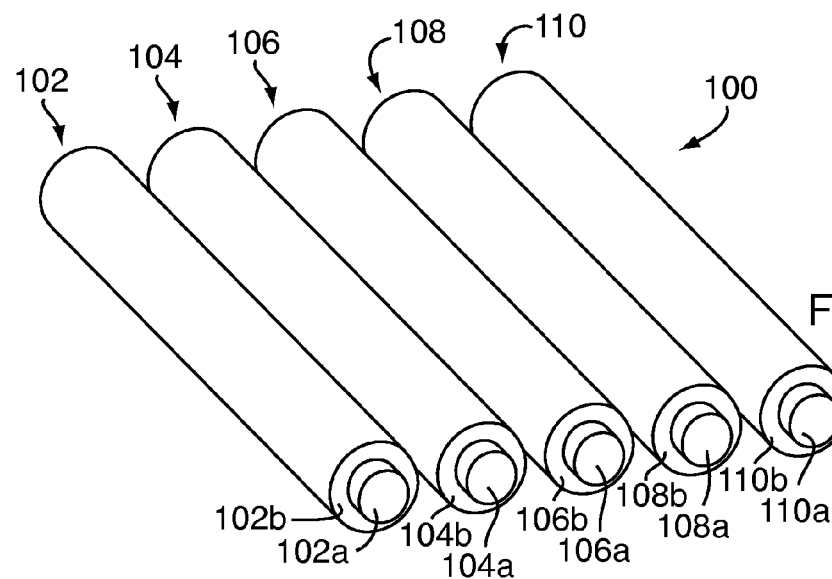
FIG. 2 is a schematic perspective view of a plurality of composite fibers wherein some of the composite fibers have thermally and electrically insulating properties, and some of the composite fibers have thermally and electrically conductive properties in accordance with the present invention.

FIG. 2 illustrates a composite material 100 including a plurality of composite fibers 102, 104, 106, 108 and 110 in accordance with an embodiment of the present invention. A portion of the composite material 100 includes fibers such as, for example, the central composite fiber 106 having thermal and electrical conductive properties. Another portion of the composite material 100 includes, for example, the lateral composite fibers 102, 104, 108 and 110, having thermal and electrical insulating properties. More specifically, a portion of the composite material 100 includes a fiber 106a. and a layer of resin 106b impregnated with a predetermined volume percentage of carbon nanotubes substantially surrounding the fiber to form the composite fiber 106 having thermal and electrical conductive properties. As an example, the fiber is IM7. fiber, and the resin is a CYCOM 5250-4. resin. Preferably, the percentage of nanotube fill is between about 2% to 3% by weight.

Another portion of the composite material 100 includes fibers 102a, 104a, 108a. and 110a.. Layers of resin 102b, 104b, 108b. and 110b. are unfilled with carbon nanotubes and respectively substantially surround the fibers 102a, 104a, 108a. and 110a. to form the composite fibers 102, 104, 108 and 110. The lack of carbon nanotubes means that the composite fibers 102, 104, 108 and 110 have thermal and electrical insulating properties which prevent electrical signals from being conducted therealong. Thus, the composite fiber 106 including carbon nanotubes is configured to serve as an electrical signal path that can replace a conventional wiring harness.

Figure 3:
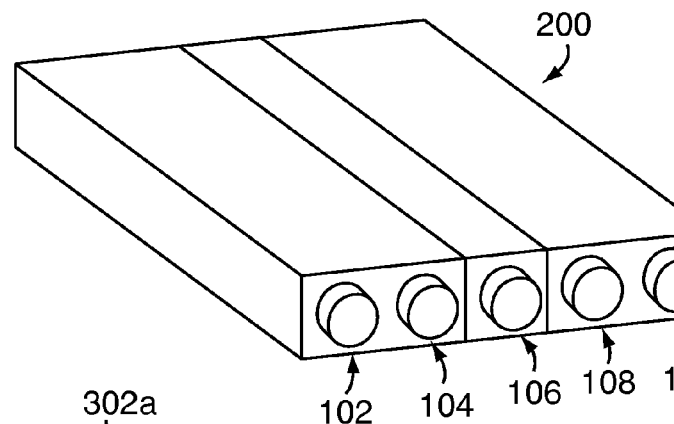
FIG. 3 is a schematic perspective view of the plurality of composite fibers processed into a sheet material.
Figure 4:
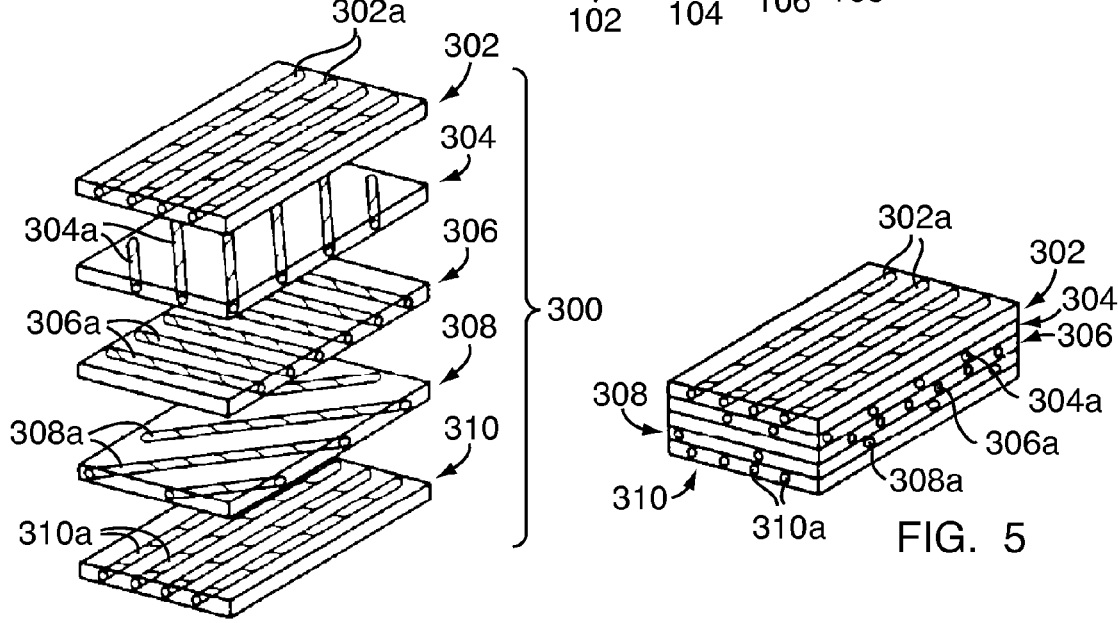
FIG. 4 is a schematic exploded perspective view of a plurality of composite fiber sheets.
Figure 5:
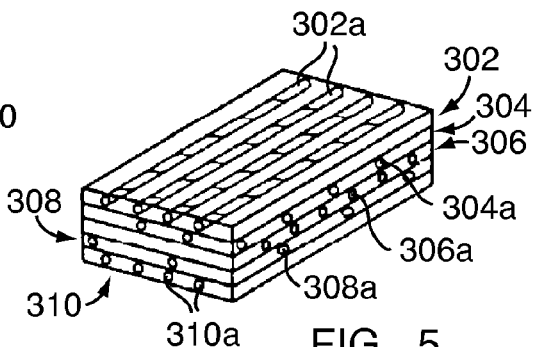
FIG. 5 is a schematic perspective view of the plurality of composite fiber sheets layed up on one another to form a combined structure.

As shown in FIG. 3, the individual composite fibers 102, 104, 106, 108 and 110 can be processed to form a single sheet 200 of composite material in order to minimize the number of composite material components. Moreover, individual sheets each carrying a plurality of composite fibers can be processed to form a single composite structure. As shown in FIGS. 4 and 5, for example, sheets 302, 304, 306, 308 and 310 can be layed up to form a single composite structure 300. Each of the sheets carries a plurality of electrically conductive and electrically non-conductive composite fibers similar to the composite fibers shown in FIGS. 2 and 3.

As shown in FIGS. 4 and 5, each sheet can carry composite fibers extending in a different direction relative to that of composite fibers carried by an adjacent sheet. Thus, the composite structure 300 can form electrical paths extending in a plurality of directions in order to send electrical signals to various locations within a gas turbine engine or other structure. As can be seen in FIG. 4, composite fibers 304a. of the sheet 304 extend in a diagonal direction relative to that of composite fibers 302a. of the sheet 302, and also extend in a diagonal direction relative to that of the composite fibers 306a. of the sheet 306. Similarly, composite fibers 308a. of the sheet 308 extend in a diagonal direction relative to that of the composite fibers 306a. of the sheet 306, and also extend in a diagonal direction relative to that of composite fibers 310a. of the sheet 310. As can also be seen in FIG. 4, the direction of the diagonal composite fibers 304a. of the sheet 304 extend in a direction generally transverse to that of the diagonal composite fibers 308a. of the sheet 308. Moreover, the direction of the composite fibers 306a of the sheet 306 extend in a direction generally transverse to that of the composite fibers 302a. of the sheet 302, as well as in a direction generally transverse to that of the direction of the composite fibers 310a. of the sheet 310. Therefore, the five-layer composite structure 310 provides electrically-conductive signal paths in four different directions.

Figure 6:
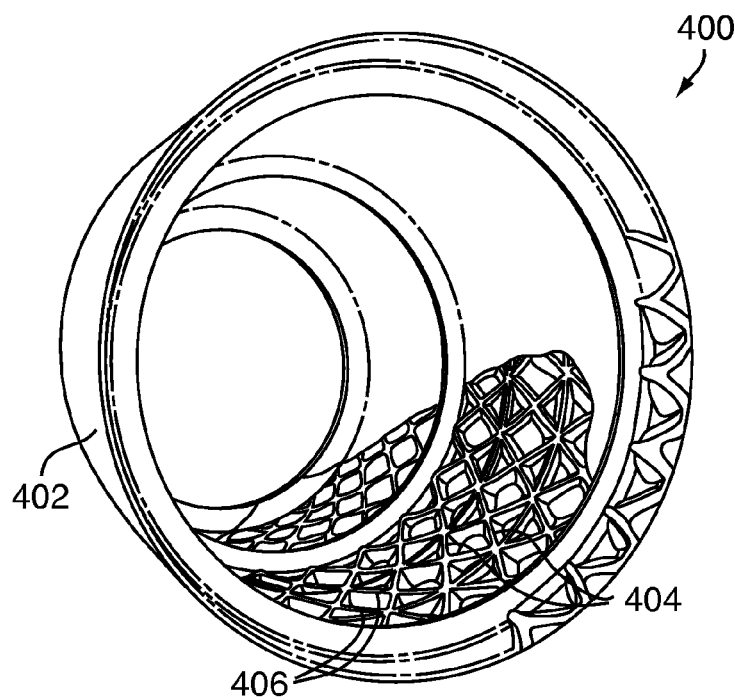
FIG. 6 is a perspective view of an engine case with multiple electrically conductive paths formed from the electrically conductive composite fibers.

FIG. 6 shows an example of a gas turbine engine component including a plurality of electrically conductive paths built into a composite structure of the component. More specifically, an engine case 400 includes a wall 402 defining a first series of electrically conductive paths 404 formed from electrically conductive composite fibers each generally extending in a first direction parallel to one another, and a second series of electrically conductive paths 406 formed from electrically conductive composite fibers each extending in a second direction parallel to one another such that the first and second series of electrically conductive paths cooperate to form a crisscross pattern.

Figure 7:
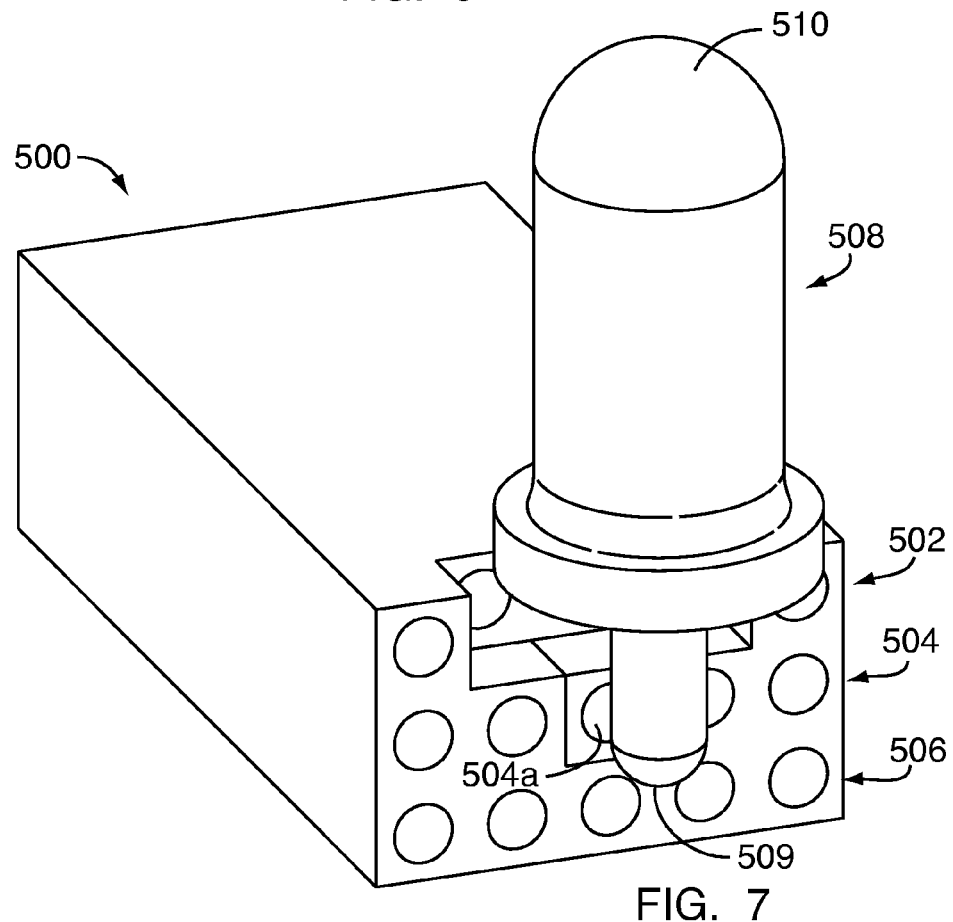
FIG. 7 is a schematic perspective view of an electrically conductive pin bonded to a surface of the combined structure of composite fibers and making contact with a conductive path located within the structure.

FIG. 7 illustrates structure configured for coupling an electrically conductive composite fiber to an external component. A composite structure 500 includes, by way of example only, three sheets or layers 502, 504, 506 of composite fibers. A composite fiber 504a. disposed in a middle layer 504 of the composite structure 500 is predetermined to form an electrically conductive path. An electrically conductive pin 506 has one end 508 extending into the composite structure 500 and coupled to an end of the electrically conductive path formed from an electrically conductive composite fiber. The pin 506 has another end 510 extending outwardly from the composite structure 500 so as to be exposed in order to electrically couple the electrically conductive path to an external component. The pin 506 can also be configured to be in the form of a nano switch coupled at the end 508 to two or more electrically conductive paths. The nano switch can thus serve to selectively electrically couple such paths to external components. Moreover, the nano switch can be implemented to selectively couple a secondary or tertiary path to an external component should a primary or secondary path fail, and thereby avoid the time and expense of replacing a failed wiring harness.

The primary aspect of this invention is that the embedded electrically conductive composite fibers eliminate wiring harnesses that in many cases can be snagged, torn, or wear against adjacent features. Being embedded within a structure, inherent protection is provided by the structure such that wear and snagging are eliminated. In the event that damage is incurred during operation, loss of signal or electrical carrying capacity can simply be switched to a secondary or tertiary circuit such that completion of a mission can be achieved. Having more than two circuits may be a benefit in that a disrupted circuit can be permanently disabled while the remaining structure still has a capable backup in the tertiary circuit.

Another aspect is added capability becomes inherent to the engine without incurring additional engine weight.

Another aspect is by eliminating external harnesses, space around an engine now becomes available for routing other features or reducing the size of an annulus surrounding the engine in order to maintain airflow or reducing airflow pressure drop along the structure.

Although the composite structure including embedded electrically conductive paths is described herein in the context of a gas turbine engine, it should be understood that such structure can be implemented in any other practical application where wiring harnesses are typically employed.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed is:

1. A gas turbine engine comprising:
a structure having a movable portion, a static portion, and a plurality of electrically conductive paths extending in a plurality of directions to send electrical signals to various locations of the gas turbine engine,
wherein the electrically conductive paths are embedded in at least one of the movable portion and the static portion, and each of the electrically conductive paths comprises a resin sleeve impregnated with carbon nanotubes and surrounding a fiber extending through the structure.

2. A gas turbine engine as defined in claim 1, wherein the static portion includes an engine casing including a fiber-resin composite material and the electrically conductive paths include carbon nanotubes coated onto selected fibers of the composite material.

3. A gas turbine engine as defined in claim 1, wherein the static portion includes a plurality of struts supporting engine components, at least one of the plurality of struts including electrically conductive paths.

4. A gas turbine engine as defined in claim 1, wherein the at least one static portion includes a composite airframe, at least a portion of the composite airframe including electrically conductive paths.

5. A gas turbine engine as defined in claim 1, further comprising a nano switch coupled to one of the electrically conductive paths and configured for selectively electrically coupling the electrically conductive paths of said gas turbine engine to an external component.

6. A gas turbine engine as defined in claim 1, wherein the electrically conductive paths are formed by carbon nanotubes coated onto selected windings of a wound-fiber composite material and are electrically interconnected with each other only at predetermined mutual crossing points, further comprising a connector located on a surface of the composite material and coupled to at least one of the electrically conductive paths for electrically coupling the at least one electrically conductive path to an external component.

7. A gas turbine engine as defined in claim 6, wherein the connector is a pin having one end extending into the composite material and contacting at least one of the electrically conductive paths, and another end extending outwardly from the composite material for electrically coupling electrically conductive paths of said gas turbine engine to an external component.

8. A gas turbine engine as defined in claim 1, wherein the electrically conductive paths are formed by carbon nanotubes integrated into a fiber-resin composite material and electrically interconnected with each other only at predetermined mutual crossing points, wherein a portion of the composite material includes fibers and a resin impregnated with a predetermined volume percentage of carbon nanotubes substantially surrounding the fibers, and another portion of the composite material includes fibers and a resin unfilled with carbon nanotubes substantially surrounding the fibers.

9. A gas turbine engine as defined in claim 8, wherein the fibers include one of glass fibers, carbon fibers and boron fibers.

10. A gas turbine engine as defined in claim 8, wherein the composite material is in the form of a sheet.

11. A gas turbine engine as defined in claim 8, wherein the composite material is in the form of a plurality of resin-coated fiber yarns in layed-up configuration.

* * * * *